US008046827B2

(12) United States Patent  
Corella (10) Patent No.: US 8,046,827 B2  
(45) Date of Patent: Oct. 25, 2011

(54) ACCESS CONTROL OF INTERACTION CONTEXT OF APPLICATION

(76) Inventor: Francisco Corella, Portland, OR (US)

( * ) Notice: Subject to any disclaimer, the term of this patent is extended or adjusted under 35 U.S.C. 154(b) by 638 days.

(21) Appl. No.: 12/138,407

(22) Filed: Jun. 12, 2008

(65) Prior Publication Data

US 2008/0313721 A1 Dec. 18, 2008

Related U.S. Application Data

(60) Provisional application No. 60/934,272, filed on Jun. 12, 2007.

(51) Int. Cl.  
*H04L 9/32* (2006.01)

(52) U.S. Cl. ......... 726/6; 726/4; 726/5; 726/7; 713/168; 713/182

(58) Field of Classification Search .................. 726/4–7; 713/168, 182  
See application file for complete search history.

(56) References Cited

U.S. PATENT DOCUMENTS

| | | | |
|---|---|---|---|
| 5,546,528 | A | 8/1996 | Johnston |
| 6,339,828 | B1 * | 1/2002 | Grawrock et al. ............ 713/183 |
| 6,408,389 | B2 * | 6/2002 | Grawrock et al. ............ 713/183 |
| 2004/0064742 | A1 * | 4/2004 | Excoffier et al. ............ 713/202 |
| 2004/0250116 | A1 * | 12/2004 | Strickland et al. ............ 713/201 |
| 2005/0138399 | A1 * | 6/2005 | Cheston et al. ............. 713/189 |
| 2007/0016454 | A1 * | 1/2007 | Tipirneni ............................ 705/3 |
| 2007/0157029 | A1 * | 7/2007 | Mani ............................. 713/183 |
| 2007/0261121 | A1 * | 11/2007 | Jacobson ........................ 726/26 |

OTHER PUBLICATIONS

Wikipedia, Password, Internet—http://en.wikipedia.org/wiki/Password, May 8, 2010, 12 pages.  
Morris et al., S3: Storable, Shareable Search, Microsoft Research, 4 pgs.  
Morris et al., SearchBar: A Search-Centric Web History for Task Resumption and Information Re-Finding, CHI 2008, 10 pgs.  
Morris et al., SearchTogether: An Interface for Collaborative Web Search, UIST '07, 2007, 10 pgs.

* cited by examiner

*Primary Examiner* — Kambiz Zand  
*Assistant Examiner* — Tongoc Tran  
(74) *Attorney, Agent, or Firm* — Dicke, Billig & Czaja, PLLC (57) ABSTRACT

A method of controlling access to an interaction context of a multi-user application includes receiving and tracking over time login requests pertaining to one of a plurality of user accounts of a virtual application instance of the multi-user application, each login request including a login password and each user account including a user password. A login request for the user account is rejected when the login password fails to match the user password of the user account. Access to the user account is denied when a consecutive number of times a login request for the user account is rejected reaches a selected limit. The user is prompted to change the user password of the user account and given limited access to the user account to do so when the user password is a permanent password and a cumulative number of rejected login requests for the user account reaches a selected threshold.

27 Claims, 10 Drawing Sheets

ACCESS CONTROL OF INTERACTION CONTEXT OF APPLICATION

CROSS-REFERENCE TO RELATED APPLICATION

The subject matter of this application is related to the subject matter of U.S. Provisional Patent Application No. 60/934,272, filed on Jun. 12, 2007, priority to which is claimed under 35 U.S.C. §119(e) and which is incorporated herein by reference.

BACKGROUND

Web applications are computer applications which are accessed by users via a Web browser over a network such as the Internet or an intranet. Often, it is desired to limit or restrict access to a Web application to only valid or registered users. To prevent access to such user restricted Web applications by unknown or invalid users, valid users are typically required to login via a Web interface using an associated User ID and password which provide authentication of the user. Due to their convenience and ease of use, password-based user authentication is the most common means of authentication on the Web.

However, passwords have a poor reputation among security professionals as being potentially susceptible to online guessing attacks by invalid users or attackers. Because Web applications (or a Web site) are accessible over the Internet from anywhere in the world, an attacker is afforded a high degree of anonymity and impunity. An attacker running a program on a client machine or on thousands of "bots" (hijacked computers) may be able to submit thousands or even millions of password guesses per second.

To protect against such online guessing attacks, one conventional countermeasure employed by Web applications is to lock out a user account, which is identified by the User ID, after a selected number of consecutive failed login attempts using the User ID but an incorrect password. The user's password must then be reset or changed, or a timeout period must elapse (e.g., 24 hours) before logins to the user account are again permitted.

While such a technique or countermeasure is generally effective, there are several drawbacks. First, it can deny service to the legitimate or valid user by repeatedly locking out the user's account and preventing the legitimate user from using the Web application. Such a denial of service may be a side effect of the guessing attack, or it may be the goal of an attack that exploits the countermeasure.

Second, although such a countermeasure limits the number of consecutive incorrect password guesses, the total number of incorrect guesses is unlimited as long as the incorrect guesses are interleaved with valid logins by the legitimate user before the selected number of consecutive incorrect guesses is reached. As such, an attacker who is able to watch or monitor a user or who can otherwise determine a pattern of logins by a legitimate user has the opportunity for an unlimited number of guesses at a password without locking out a user or putting the user on notice that he/she is under attack. A Web application employing such a countermeasure is particularly vulnerable to such "denial of service" attacks by an ex-user who may know the User IDs of several or all of the legitimate or valid users.

Additionally, such a countermeasure does not address a situation created by "password capture" from a different Web site or Web application. Faced with the problem of having to remember USER IDs and passwords for a large number of Web sites and Web applications, many users simply reuse the same User IDs and passwords. An attacker may be able to exploit this by capturing User IDs and passwords from less protected Web sites or by setting up a malicious or rogue Web site for the purpose of collecting or capturing User IDs and passwords. The attacker can then employ these captured User IDs and passwords against a target Web application.

Another conventional countermeasure is to employ a technique commonly referred to as "password aging." According to password aging techniques, a User is forced to change his/her password after a selected amount of time has expired (e.g., 3 months, 6 months, or 1 year), the idea being that the likelihood of a password being successfully guesses will be reduced. However, such a technique is inconvenient as a user is continually forced to remember a new password, regardless of whether the user account has been attacked by an invalid user, and because a user must first be assigned a temporary password by an administrator of the Web application (e.g., via a secure connection) before the user is able to change to a permanent password.

SUMMARY

One embodiment provides a method of controlling access to an interaction context of an application including receiving, tracking over time, and acting upon login requests pertaining to an access account, each login request including a login password to be matched against an access password associated with the access account. The access password is a permanent password. The method includes denying access upon receipt of a login request when the login password fails to match the access password. The method includes maintaining a first count and a second count of password match failures, both counts being incremented upon receipt of a login request when the login password fails to match the access password at least until the first count has reached a selected limit. The method includes denying access upon receipt of a login request when the first count has reached the selected limit. The method includes granting access and restarting the first counter from zero upon receipt of a login request when the login password matches the access password, the first count is less than the selected limit, and the second count is less than a selected first threshold. The method includes prompting a change of the access password upon receipt of a login request when the login password matches the access password, the first count is less than the selected limit, but the second count has reached the selected first threshold. The method includes restarting both counts from zero whenever the access password is changed.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. It is to be understood that the features of the various exemplary embodiments described herein may be combined with each other, unless specifically noted otherwise. The following detailed description, therefore, is not to be taken in a limiting sense, and the scope of the present invention is defined by the appended claims.

It is to be understood that features of the various exemplary embodiments described herein may be combined with each other, unless specifically noted otherwise.

Figure 1:
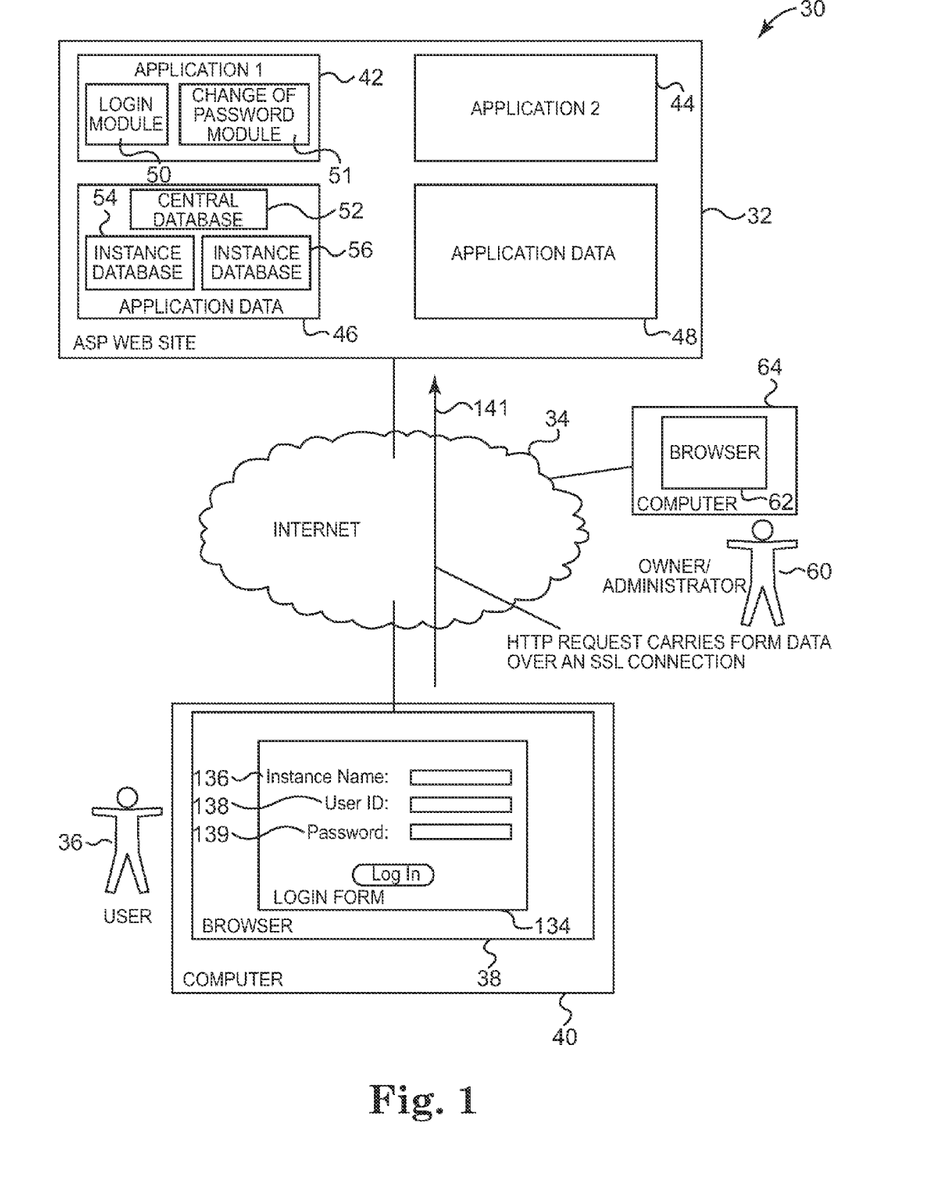
FIG. 1 is a block diagram generally illustrating an example of a system for operating a Web application employing techniques to prevent on-line password guessing attacks according to one embodiment.

FIG. 1 is a block diagram generally illustrating an example of a system 30 for operating a Web application employing techniques to prevent online password guessing attacks including a combination of short and long counters according to embodiments described herein. According to one embodiment, as will be described in greater detail below, after a consecutive number of incorrect attempts against a password of a user account reaches a number equal to a short counter limit (e.g., 5 incorrect attempts), the user is denied access. Additionally, after a cumulative number of incorrect guesses against a password of a user account (i.e., not required to be consecutive) reaches a number equal to a long counter threshold (e.g., 30 incorrect attempts), the account user is prompted to change the password and is given only limited access allowing the application to be used to the extent of changing the password, and not allowing other use of the application.

According to one embodiment, as illustrated by FIG. 1, system 30 includes an application service provider (ASP) Web site 32 which is accessible over a network such as the Internet, as illustrated at 34, by at least one user, such as user 36, via a browser 38 residing on a computer 40 (e.g., a PC). It is noted that ASP Web site 32 may reside on a single computer (e.g., a server computer) or on multiple computers which may be remotely located relative to one another.

According to one embodiment, ASP Web site 32 includes one or more applications, such as applications 42 and 44, wherein each application is a software application for performing desired operation, and application data corresponding to each application, such as application data 46 and 48 respectively corresponding to applications 42 and 44.

According to one embodiment, a user, such as user 60, registers with the ASP Web Site 32 to create and become an "owner" of a "virtual application instance" of an application, such as application 42. The owner 60 serves as an administrator of the virtual application instance and may grant administrative privileges to other users. According to one embodiment, only owner 60 registers with the ASP, while other users, such as user 36, are granted access to application 42 by administrators (e.g., owner/administrator 60) such as via user accounts, for example.

According to one embodiment, applications further include a login module and change-of-password module, such as login module 50 and change-of-password module 51 of application 42, which are configured to control access to an application, such as application 42, to valid users and, according to one embodiment, employing a combination of short counter and long counters as mentioned above. In one embodiment, each application data includes a central database, and one or more instance databases, one for each virtual application instance, such as central database 52, instance database 54, and instance database 56 of application data 46.

Figure 2:
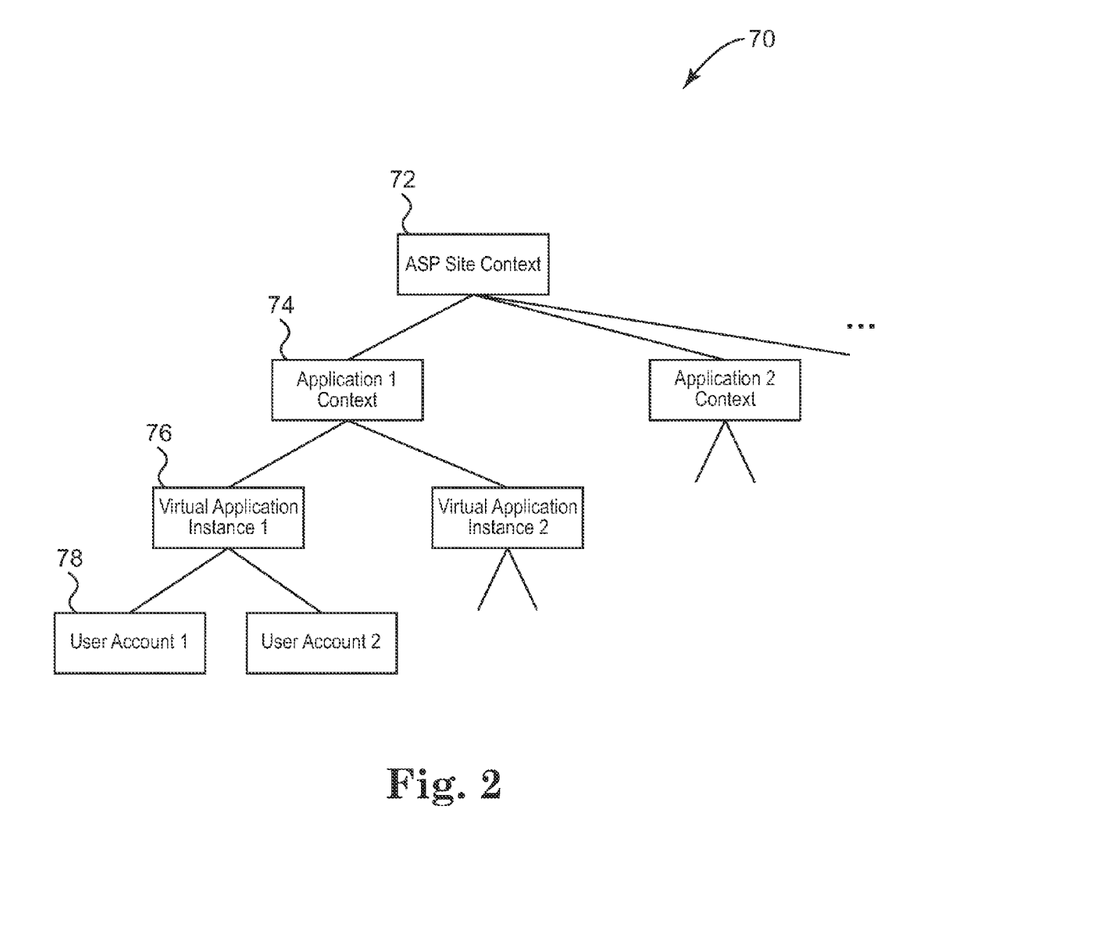
FIG. 2 is a tree diagram illustrating interaction contexts of a user with a website according to one embodiment.

Each interaction of user 36 with ASP Web site 32 takes place within an "interaction context." FIG. 2 is a tree diagram 70 illustrating such interaction contexts according to one embodiment. Each box in FIG. 2 represents an interaction context, with a line between two interaction contexts indicating that the upper box or interaction context is more general than the lower box or interaction context. For example, the box indicated at 72 represents a more general interaction context than the interaction context represented by box 74, with the interaction context represented by box 74 being a sub-context of the interaction context represented by box 72.

With reference to FIG. 1, all interactions with ASP Web site 32 take place within ASP Site Context 72. As illustrated by FIG. 1, ASP Web site 32 provides one or more applications, such as first application 42 and second application 44, for use by users, such as user 36. When a user, such as user 36, uses an application, such as first application 42, the interactions of the user with ASP Web site 32 take place within an application context, such as application 1 context, as indicated at 74.

When user 36 logs in to an application, such as first application 42, such as by submitting a login form, such as login form 134 of FIG. 1, subsequent interactions take place within the context of a "virtual application instance" specified by an instance name input 136 of login form 134. A virtual application instance is a particular kind of interaction context, such as a virtual application instance as indicated at 76. According to one embodiment, when a user, such as user 36, logs in by submitting login form 134, user 36 more specifically logs in to a user account as specified by login ID input 138 of login form 134. Subsequent interactions, thus, also take place within a more specific interaction context provided by the user account. A user account, such as user account 1 at 78, is a particular kind of interaction context which is more specific than a virtual application instance, such as virtual application instance 76.

In one embodiment, where login forms, such as login form 134, are not specific to a particular virtual application instance, there are no interactions that take place within the context of a virtual application instance without also taking place within the context of a user account. However, there are alternative embodiments. In one embodiment, a user first selects a particular virtual application instance using an instance-selection form. The browser then downloads a page containing a login form that is specific to the selected virtual application instance. Then the user uses this instance-specific login form to log in to the selected virtual application instance, by providing a user ID and a password. In such an embodiment, the interactions of downloading the page containing the instance-specific login form and of submitting the instance-specific login form take place in the interaction context of the selected virtual application instance, such as application interaction context 76, without taking place in the interaction context of any particular user account. Again in this embodiment, the interactions of downloading the page containing the instance-selection form, and of submitting the instance-selection form, take place within the interaction context of an application without taking place in the interaction context of any particular virtual application instance. In an embodiment that uses a login form, such as login form 134, the interactions of downloading the page that contains the (non-instance-specific) login form 134 and of submitting the form also take place in the interaction context 74 of an application without taking place in the interaction context of any particular virtual application instance.

Figure 3:
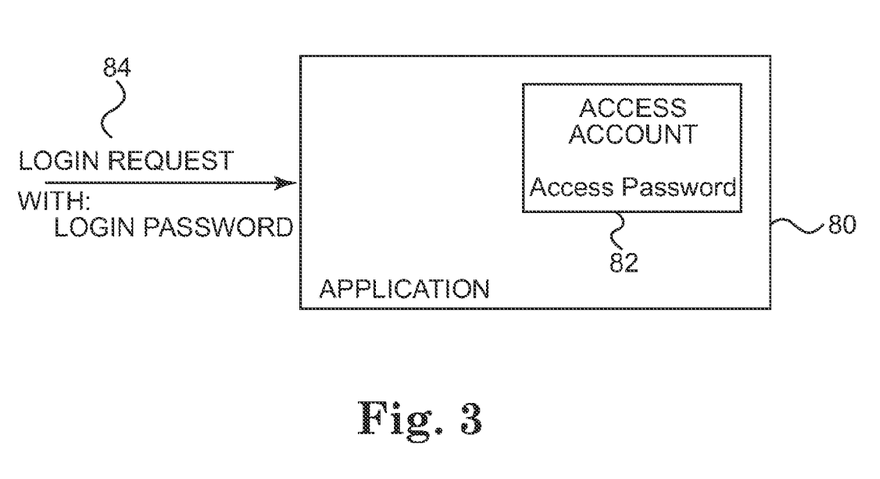
FIG. 3 is a block diagram generally illustrating an application having an access account including an access password.
Figure 4:
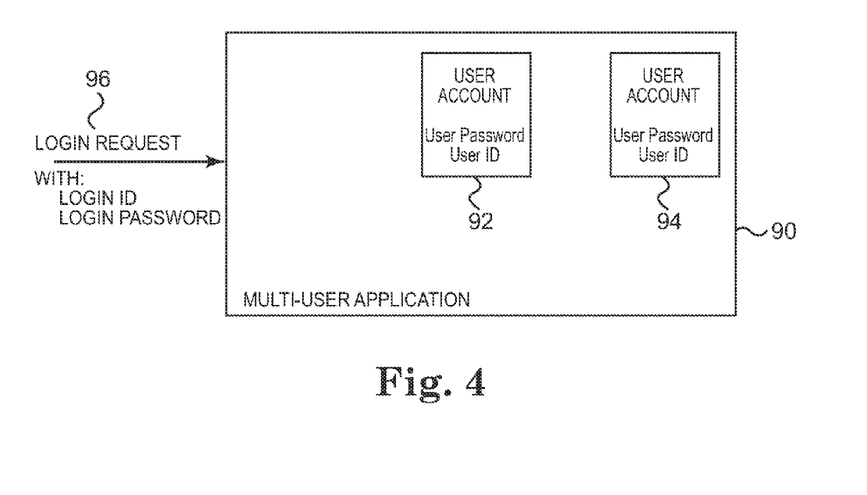
FIG. 4 is a block diagram generally illustrating a multi-user application having a plurality of user accounts.
Figure 5:
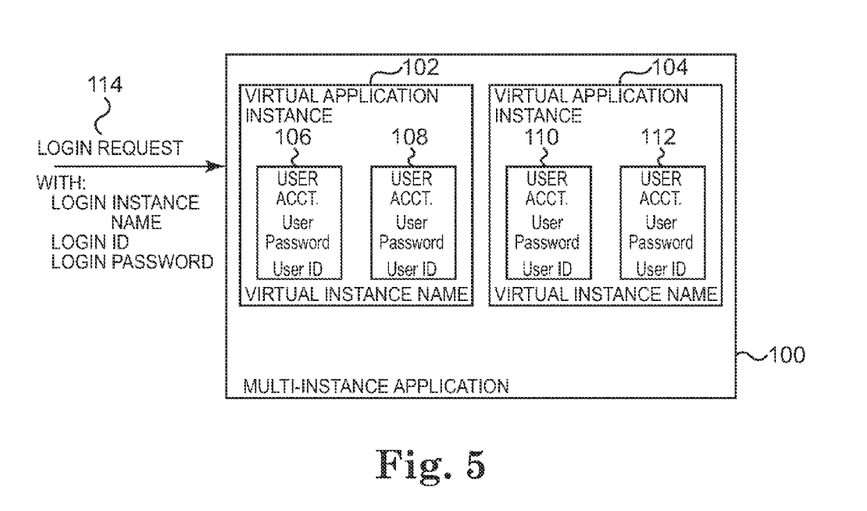
FIG. 5 is a block diagram generally illustrating a multi-user, multi-instance application including a plurality of virtual application instances, each virtual application instance including one or more user accounts.

Embodiments for controlling access to an interaction context of an application employing a short counter and a long counter are described in detail herein with respect to a multi-instance, multi-user Web application. However, embodiments include other suitable application types for which access to an interaction context is controlled with short and long counters. FIGS. 3 through 5 below illustrate examples of such suitable application types.

For example, FIG. 3 generally illustrates an application 80 having an access account 82 including an access password. Application 80 is accessed by a user via submission of a login request, as indicated at 84, including a login password. Access is granted to application 80 upon receipt of a login request 84 having a login password matching the access password of access account 82.

FIG. 4 generally illustrates a multi-user application 90 having a plurality of user accounts, such as user accounts 92 and 94, each user account including a user ID and a user password. Access is granted to multi-user application 90 within a user account upon receipt of a login request 96 having a login ID and login password respectively matching a user password and user ID of the user account, such as user account 92.

FIG. 5 illustrates a multi-user, multi-instance application 100 including a plurality of virtual application instances, such as virtual application instances 102 and 104, each virtual application instance having a virtual instance name. Each virtual application instance includes one or more user accounts, such as user accounts 106 and 108 of virtual application instance 102 and user accounts 110 and 112 of virtual application instance 104, with each user account having a user ID and a user password. Access is granted to a virtual application instance within a user account, such as user account 106 of virtual application instance 102, upon receipt of a login request 114 having a login instance name matching the virtual instance name of virtual application instance 102 and a login ID and a login password respectively matching the user ID and user password of user account 106.

In one embodiment, multi-instance, multi-user application 100 is implemented as a Web application, such as applications 42 and 44 of FIG. 1, for example. According to such an embodiment, each virtual application instance, such as virtual application instances 102 and 104, has a corresponding instance database, such as instance databases 54 and 56, for example.

Figure 6:
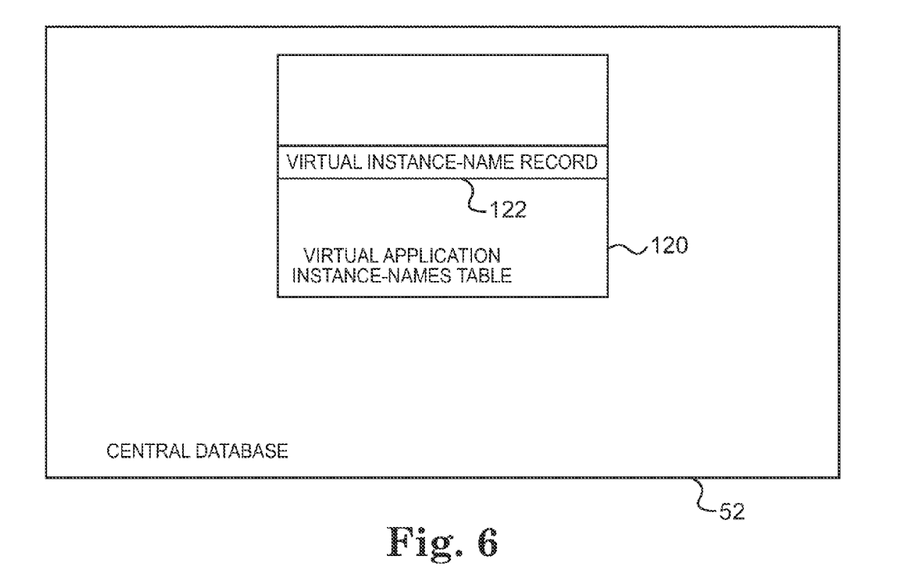
FIG. 6 is a block diagram generally illustrating a central database according to one embodiment.
Figure 7:
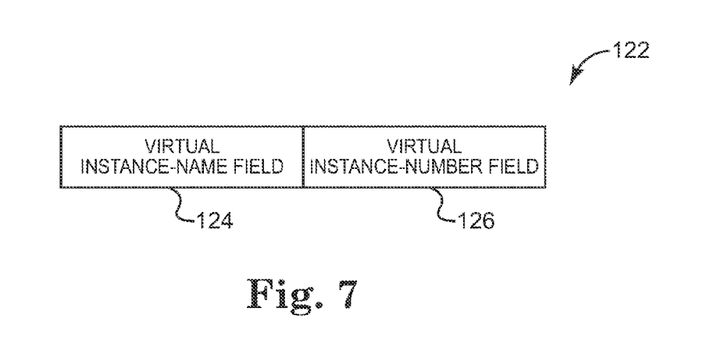
FIG. 7 is a block diagram generally illustrating an instance-name record according to one embodiment.

FIG. 6 illustrates one embodiment of a central database 52 of the system 30 illustrated in FIGS. 1 and 2. As illustrated in FIG. 6, central database 52 includes a virtual application instance-names table 120, with table 120 including one or more virtual instance-name records, such as virtual instance-name record 122. In turn, according to one embodiment, as illustrated by FIG. 7, each virtual instance-name record, such as virtual instance-name record 122 includes a virtual instance-name field 124, which serves as a primary key, and a virtual instance-number field 126. According to one embodiment, login module 50 employs the virtual instance-name records of central database 52, such as virtual instance-name record 122, to map a virtual instance name (e.g., virtual instance-name field 124) to a virtual instance number (e.g., virtual instance-number field 126) which, in-turn, is used to locate the corresponding instance database (e.g., instance database 54 corresponding to virtual application instance 102).

Figure 8:
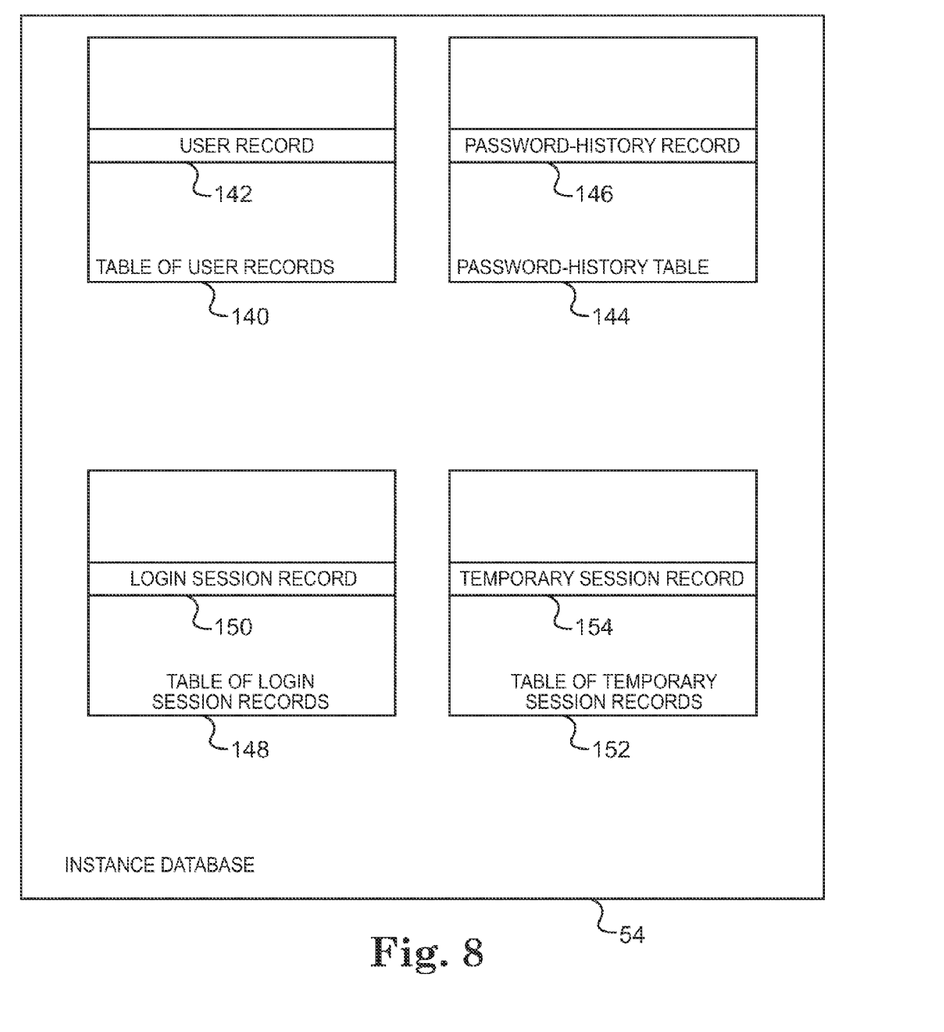
FIG. 8 is a block diagram generally illustrating an instance-database according to one embodiment.

As illustrated by FIG. 8, according to one embodiment, each instance data base, such as instance database 54, includes a table of user records 140 having one or more user records 142 (one for each user, such as user 36), a password history table 144 having one or more password-history records 146, a table of login session records 148 having one or more login session records 150, and a table of temporary session records 152 having one or more temporary session records 154. According to one embodiment, as is described in greater detail below, each instance database, such as instance database 54, tracks users of virtual application instances, such as user 36 of virtual application instance 102, and uses non-persistent cookies to associate HTTP requests with sessions.

Figure 9:
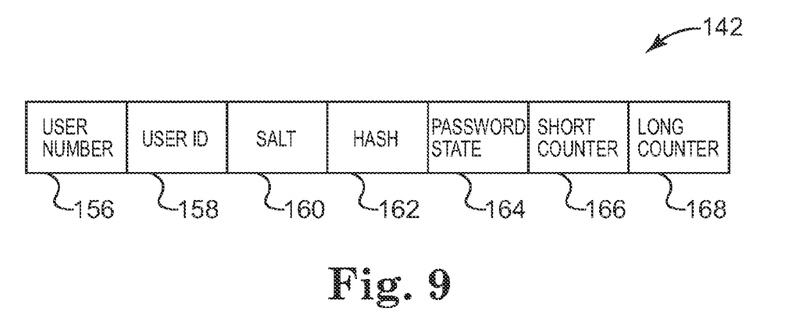
FIG. 9 is a block diagram generally illustrating a user record according to one embodiment.

As illustrated by FIG. 9, according to one embodiment, each user record 142 includes a user number field 156, which serves as a primary key, a user ID field 158, containing the user's User ID, a salt field 160, wherein a "salt" comprises a random value, and a hash field 162, containing a "hash" of the concatenation of the salt and the user's password as computed by a cryptographic hash algorithm (e.g., "SHA1"). In other embodiments, in lieu of salt field 160 and hash field 162, user record 142 may simply include a password field containing the user's password. As used herein, the "hash of a data item" means "the hash of that data item computed by the cryptographic hash algorithm," and the "hash of a salt and a password" means "the hash of the concatenation of the salt and the password as computed by the cryptographic algorithm."

According to the embodiment of FIG. 9, user record 142 further includes a password-state field 164 which indicates whether the current user password is a temporary password (e.g., as set by an administrator, such as administrator 60, and to be changed by the user, such as user 36) or a permanent password (i.e., chosen by the user), a short counter field 166 used as a counter and containing an integer value of consecutive failed attempts against the password of the user account, and a long counter field 168 used as counter and containing an integer value of cumulative or total failed attempts against the password of the user account. In one embodiment, the integer values of both short counter field 166 and long counter field 168 are initialized to a value of "0" when the user account is created and whenever the user password is changed by the user.

Figure 10:
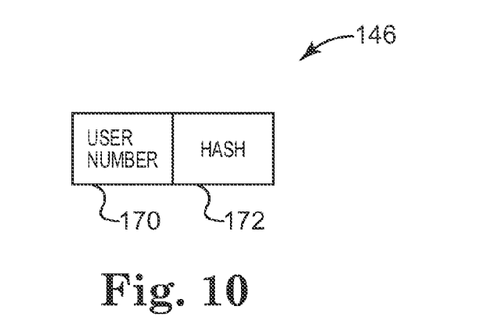
FIG. 10 is a block diagram generally illustrating a password-history record according to one embodiment.

FIG. 10 illustrates one embodiment of password-history record 146 of instance database 54, which includes a user-number field 170 and a hash field 172. According to one embodiment, for every user of virtual application instance 102 and for each password that has ever been assigned to a user's account there is a password-history record 146 where user-number field 170 contains the hash of the password and the salt stored in the user's user record 142. In one embodiment, there is one salt per user, which is stored in salt field 160 of user record 142, wherein all hashes of passwords for a user are computed using the same salt, but hashes of passwords for different users are computed using different salts.

Figure 11:
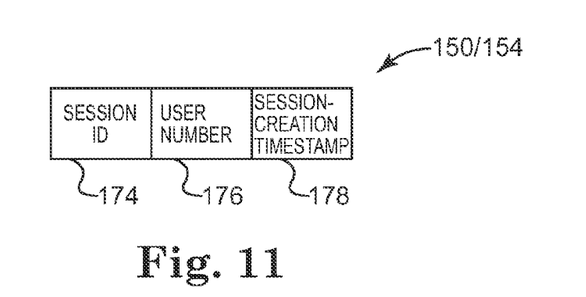
FIG. 11 is a block diagram generally illustrating a login/temporary session record according to one embodiment.

FIG. 11 illustrates one embodiment for both a login-session record 150 and a temporary-session record 154 of instance database 54. As illustrated, both login session record 150 and temporary session record 154 include a session ID field 174, which serves as a primary key, a user number field 176 through which the session record refers to a user record, such as user record 142, and a session-creation timestamp 178 that records the time when the session was initiated and is used to implement session expiration. A session is deemed to have expired if the age of the session record exceeds an allowed session lifetime.

Figure 12:
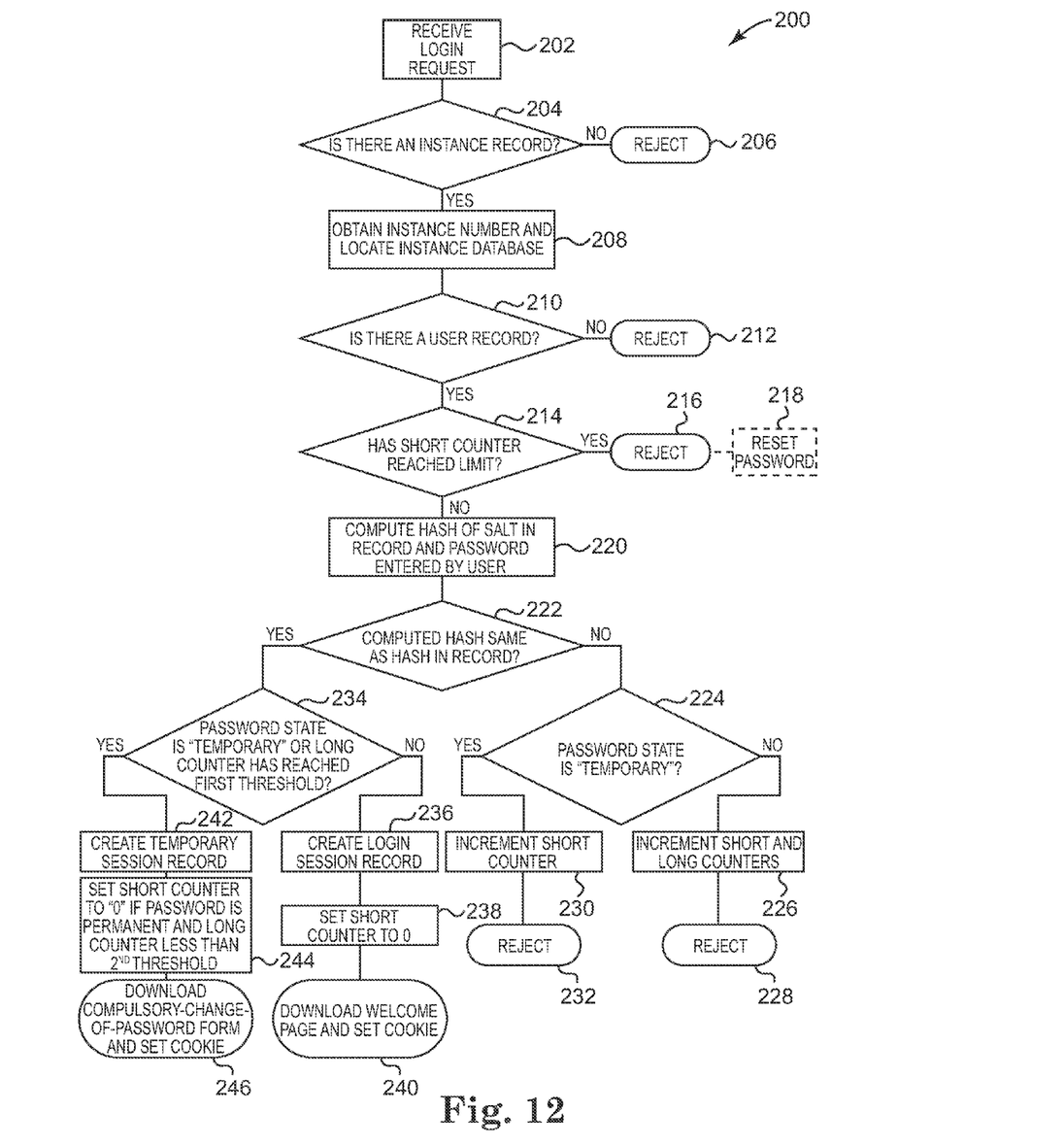
FIG. 12 is a flow diagram illustrating a login process according to one embodiment.

FIG. 12 is a flow diagram illustrating one embodiment of a login validation process 200 employed by a login module of a Web application, such as login module 50 of application 42. With reference to FIGS. 1 and 12, process 200 begins at 202 with a receipt of a login form submitted by a user, such as login form 134 submitted by user 36. According to one embodiment, login form 134 is an HTML form having three data inputs: an instance name input 136, a User ID input 138, and a password input 139. According to one embodiment, the virtual application instance name is chosen and can be changed by the user who creates the instance and becomes its owner, such as owner 60, and is a secret known only to the users of the instance. Similarly, according to one embodiment, the user's User ID is chosen by the administrator who creates the user's user account and can be change by an administrator. The password is known only to the user.

After filling out login form 134, the login request is transmitted from browser 38 to ASP Web site 32 (e.g., to a server computer) in an HTTP request. The login request and all subsequent HTTP requests are transmitted over an SSL connection, as indicated at 141, which employs SSL/TLS protocol to encrypt connection 141 to ASP Web site 32 after authenticating the computer system at the other end of connection 141 as one used by ASP Web site 32.

As illustrated in FIG. 12, after receiving the data entered via login form 134, process 200 proceeds to 204 where it queries, such as via login module 50, whether any virtual instance name record 122 in central database 52 has a virtual instance name field 124 that contains a virtual instance name that matches the virtual instance name entered instance name input 136 of login form 134. If the answer to the query at 204 is "no" (i.e., no such virtual instance name record 122 is found in central database 52), login module 50 rejects the login attempt as being invalid, as indicated at 206.

If the answer to the query at 204 is "yes" (i.e., such a virtual instance name record 122 is found in central database 52), process 200 proceeds to 208 where login module 50 uses the virtual instance number found in virtual instance number field 126 of the virtual instance name record 152 to locate the corresponding instance database, such as instance database 54. Subsequently, at 210, process 200 queries whether any user record 142 in the table of user records 140 of the corresponding instance database, such as instance database 54, has a User ID field 158 that contains a User ID that matches the User ID entered in the User ID input 138 of login form 134. If the answer to the query at 210 is "no" (i.e., no such user record 142 is found in the instance database), login module 50 rejects the login attempt as being invalid, as indicated at 212.

If the answer to the query at 210 is "yes" (i.e., such a user record is found in the instance database), process 200 proceeds to 214 where it queries whether the short counter number in short counter field 166 of the matching user record 142 is equal to a selected short counter limit (e.g., an integer value of "5"). If the answer to the query at 214 is "yes", the consecutive number of failed login attempts or bad guesses against the user's password has reached the short counter limit and the login attempt is rejected as being invalid, as indicated at 216.

When the short counter limit is reached, the user can no longer log in. According to one embodiment, the user is instructed to contact an administrator when the user cannot log in. An administrator has administrative privileges that allow the administrator to reset the user password to a new password. The new password is a new password to be changed by the user, this being indicated by the password state field 162 of user record 142. The dashed box at 218 illustrates the fact that an administrator may reset the user's password when the short counter limit is reached.

If the answer to the query at 214 is "no", process 200 proceeds to 220 where login module 50 computes the hash of the salt stored in hash field 162 of user record 142 and the password entered by the user in password input 139 of login form 134. At 222, process 200 queries whether the computed hash matches the hash contained in hash field 162 of user record 142. If the answer to the query at 222 is "no", process 200 proceeds to 224 where it queries whether the password is a temporary password by checking the value of password state field 164 of user record 142. If the answer to the query at 224 is "no" (i.e., the password is a permanent password), the integer values of both short and long counter fields 166 and 168 of user record 142 are incremented by "1", as indicated at 226, and the login attempt is rejected as being invalid, as indicated at 228. If the answer to the query at 224 is "yes" (i.e., the password is a temporary password), the integer value of long counter field 168 remains unchanged and only short counter field 166 is incremented by "1", as indicated at 230, and the login attempt is rejected as being invalid, as indicated at 232.

If the answer to the query at 222 is "yes", the login attempt is deemed valid and process 200 proceeds to 234 where it queries whether the password is a temporary password by checking the value of password state field 164 of user record 142, or whether the long counter number in long counter field 168 of the matching user record 82 is equal to a selected long counter threshold (e.g., an integer value of "30"). If the answer to both queries at 234 is "no", process 200 proceeds to 236 wherein login module 50 generates a random session ID and adds a login session record 150 to the table of login session records 148 of the instance database 54, the record containing the session ID in field 174, the user number found in the matching user record 142 in field 176, and a timestamp in field 178.

At 238, the integer value of the short counter field 166 of user record 142 is set to "0" and, at 240, a welcome page is downloaded and a cookie containing the session ID as its value is set in the user's browser, such as browser 38 of user 36. Browser 38 returns the cookie to application 42 of ASP Web site 32 with each subsequent HTTP request, and the session ID is used to authenticate the request by associating it with the login session.

If the answer to either of the queries at 234 is "yes", process 200 proceeds to 242 wherein login module 50 generates a random session ID and adds a temporary session record 154 to the table of login session records 152 of the instance database 54, the record containing the session ID in field 174, the user number found in the matching user record 142 in field 176, and a timestamp in field 178.

According to one embodiment, the integer value of the short counter field 166 of user record 142 is set to "0" if the integer value of the long counter field 168 is less than a second selected long counter threshold, which is greater than or equal to the long counter threshold value at 234. Subsequently, at 246, a cookie is set in the user's browser, and a compulsory change of password page (see FIG. 13 below) is downloaded via which the user must enter a new password to replace the current password. It is noted that the current password may be a temporary password, such as a password set by an administrator at 218, or a permanent password that must be replaced because the long counter has reached the first threshold.

Figure 13:
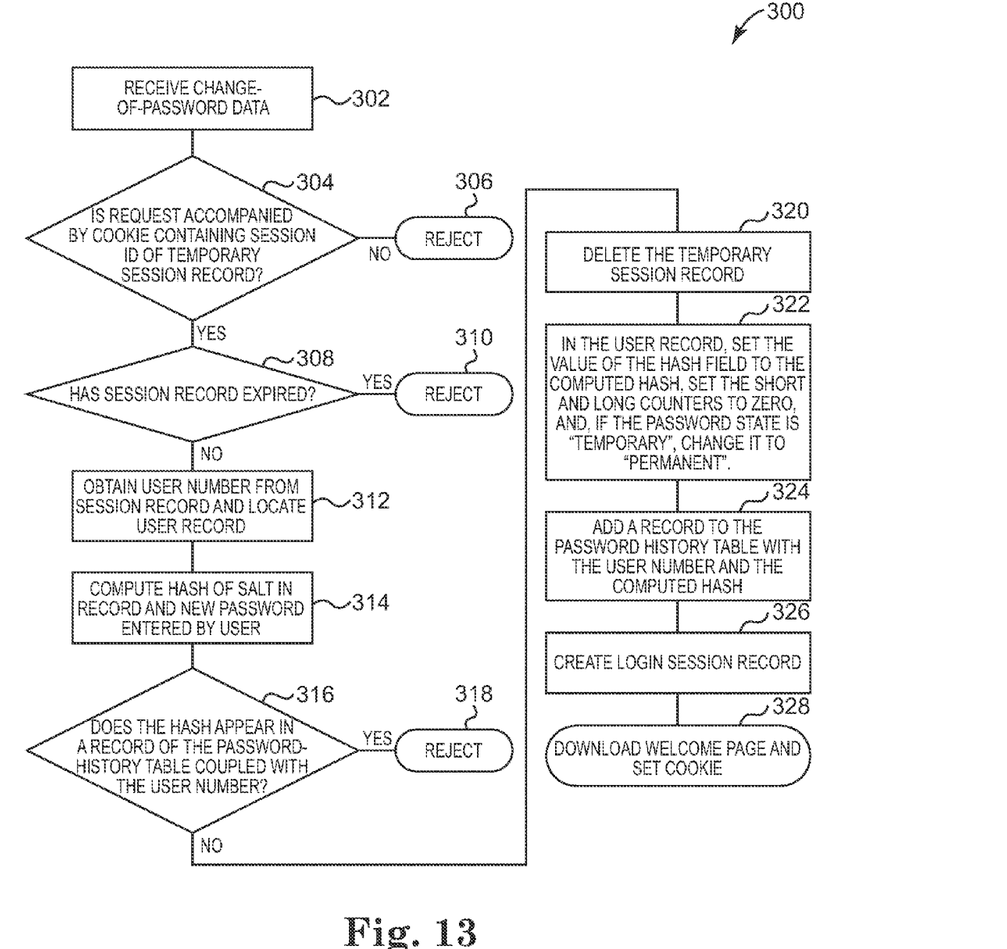
FIG. 13 is a flow diagram illustrating a compulsory password reset process according to one embodiment.

FIG. 13 is a flow diagram illustrating one embodiment of a compulsory change of password process 300 employed by a change of password module, such as change of password module 51 of application 42. Process 300 begins at 302 with receipt of data entered received via the compulsory change-of-password request HTTP provided at 246 of FIG. 12, including a new password. At 304, process 300 authenticates the change-of-password request by querying whether it is accompanied by a cookie containing a session ID of a temporary session record 154. If the answer to the query at 304 is "no", the change-of-password request is rejected, as indicated at 306. If the answer to the query at 304 is "yes", process 300 proceeds to 308 wherein, based on session-creation timestamp field 178, it queries whether temporary session record 94 has expired. If the answer to the query at 308 is "yes", the change-of-password request is rejected, as indicated at 310.

If the answer to the query at 308 is "no", process 300 proceeds to 312 where the user's user number is obtained from user number field 176 of temporary session record 154 and used to locate the corresponding user record 142 from user record table 140 of instance database 54. At 314, the change of password module computes the hash of the salt stored in salt field 160 of user record 142 and the new password received via the compulsory change-of-password request.

At 316, process 300 queries whether the computed hash at 314 matches a password-history record 86 in password-history table 144 having a user number field 170 containing the user number obtained at 312. If the answer to the query at 316 is "yes", the user has previously used the entered password and the change-of-password request is rejected, as indicated at 318. If the answer to the query at 316 is "no", process 300 proceeds to 320 where the temporary session record 154 is deleted from the table of temporary session records 152.

At 322, change of password module 51 changes the password of the user to the new password by storing the hash in hash field 162 of the corresponding user record 142, and also sets the integer values of both the short and long counter fields 166 and 168 to "0". Additionally, if the value of password state field 164 indicates that the password is temporary, it is changed to indicate that the password is permanent. It is noted that the user can voluntarily change his/her password at any time.

At 324, change of password module 51 adds a password history record 146 to the password-history table 144, including with the user's user number in user number field 170 and the hash in hash field 172. At 326, a login session record 150 is created and added to the table of login session records 148, including the same session ID as the temporary session record 154 in the session ID field 174. At 328, the welcome page is downloaded to the user's browser, such as browser 38 of user 36.

By employing both a long counter and short counter, as described herein, embodiments of applications (e.g., Web applications) are able to greatly limit the number of guesses against a password of a user account by an invalid user or attacker. The short counter limits the number of consecutive incorrect guesses to a selected limit, wherein incorrect guesses are considered to be consecutive if there is no intervening successfully completed login to the user account, while the long counter is used to prompt the user to change the password after the cumulative number of incorrect guesses reaches a selected first threshold. As such, even if an attacker is careful so as not to reach the selected short counter limit at any one time, the attacker is still limited by the likely possibility that the user will change the password when the cumulative number of incorrect guesses reaches the first threshold. Furthermore, even if the user does not change the password as prompted, once the cumulative number of incorrect guesses reaches a second threshold (which may or may not be equal to the first threshold), the short counter is no longer reset when the user logs in again with a valid password. Therefore there is an absolute limit to the number of incorrect guesses. For example, if the selected limit for the short counter has a value of 5, the selected first threshold for the long counter has a value of 30, and the selected second threshold has a value of 40, the user will be prompted to change the password after 30 incorrect guesses. The user may neglect to do so and may log in again, thus resetting the short counter and creating more opportunities for an attacker to make more guesses. However, once the cumulative number of incorrect guesses has reached 40, the short counter is no longer reset. The value of the short counter is at least one (it has been incremented as the long counter reached 40), so after 4 more incorrect guesses it will reach the limit of 5. Thus in this example there can be at most 44 incorrect guesses against the user's password. Additionally, by including an instance name in addition to a User ID and a User Password as part of a login request, embodiments of applications (e.g., Web applications) provide protection against passwords obtained at other Web sites or via rogue Web applications. Even if an attacker is able to obtain passwords for a user account by such means, the attacker will still not be able to gain access to the virtual application instance without knowing the instance name (wherein the instance name is a secret known only to the owner, administrator(s), and users of the virtual application instance). Additionally, if an attacker, such as a former user or administrator, knows multiple user IDs of users of a virtual application instance, such an attacker can be thwarted by simply changing the instance name.

Furthermore, according to embodiments, it is only necessary for an administrator to intervene and reset a password in situations where the selected limit for the short counter is reached, which are situations where an on-line password guessing attack should be suspected. In those situations where the threshold value for the long counter is reached, which is more likely to occur over time due to a valid user mistyping or occasionally forgetting his/her password rather than being due to an on-line guessing attack, a user is able to change his/her own password.

Figure 14:
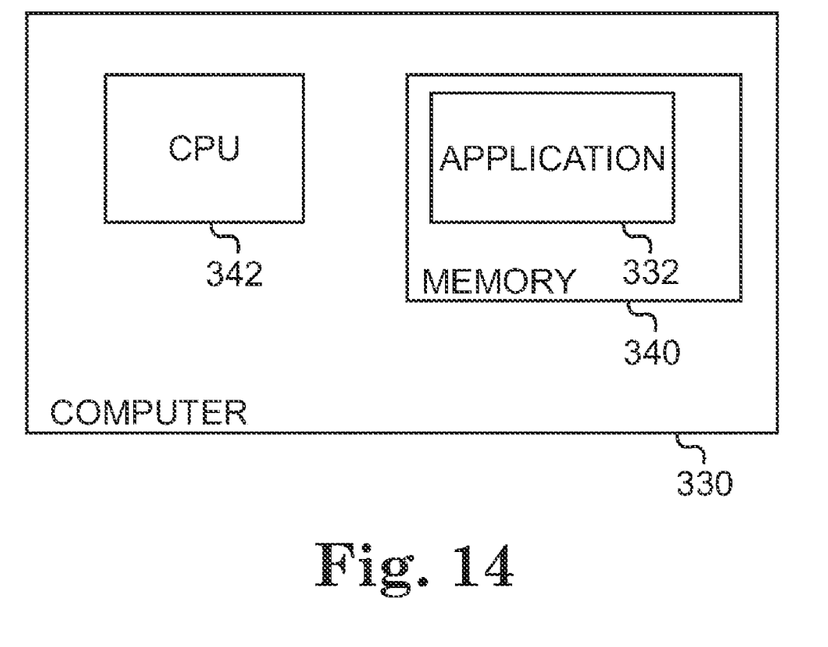
FIG. 14 is a block diagram of a computer system according to one embodiment.

FIG. 14 is a block diagram generally illustrating a computer system 330 for implementing an example application 332 (e.g., applications 42 and 44 of ASP Web site 32 illustrated in FIG. 1). One embodiment of computer system 330 is a server computer. As illustrated, according to one embodiment, application 332 is stored in a memory 340 and operable by a central processing unit (CPU) 342 of computer system 330. According to one embodiment, portions of application 332 may be stored in memories of multiple computers.

As such, components of embodiments can be implemented in hardware via a microprocessor, programmable logic, or state machine, in firmware, or in software with a given device. In one embodiment, at least a portion of the software programming is web-based and written in the PERL programming languages, including links to Web server software, such as Apache, and each of the main components may communicate via a network using a communication protocol. For example, embodiments may or may not use a TCP/IP protocol for data transport between browsers and servers and between computers within the ASP Web Site. Other programming languages and communication protocols suitable for use with embodiments will become apparent to those skilled in the art after reading the present application. Components of embodiments may also reside in software on one or more computer-readable mediums, which is defined herein to include any kind of memory, volatile or non-volatile, removable or non-removable, such as floppy disks, hard drives, read-only memory (ROM), CD-ROMs, flash memory, and random access memory (RAM).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of controlling access to an interaction context of an application, the method comprising:
receiving, tracking over time, and acting upon login requests pertaining to an access account, including a login request, each login request including a login password to be matched against an access password associated with the access account, wherein the access password is a permanent password;
denying access upon receipt of the login request when the login password fails to match the access password;
maintaining a first count and a second count of password match failures, wherein the first count is a short count counting consecutive password match failures and the second count is a long count counting cumulative password match failures, both counts being incremented upon receipt of the login request when the login password fails to match the access password at least until the first count has reached a selected limit;
denying access upon receipt of the login request when the first count has reached the selected limit;
granting access and restarting the first count from zero upon receipt of the login request when the login password matches the access password, the first count is less than the selected limit, and the second count is less than a selected first threshold;
prompting a change of the access password upon receipt of the login request when the login password matches the access password, the first count is less than the selected limit, but the second count has reached the selected first threshold; and
restarting both counts from zero whenever the access password is changed.

2. The method of claim 1 comprising:
limiting access upon receipt of a login request when the login password matches the access password, the first count is less than the selected limit, but the second count has reached the selected first threshold, the limited access allowing the application to be used via the access account to the extent of changing the access password, but not allowing other use of the application via the access account.

3. The method of claim 1, comprising:
restarting the first count from zero upon receipt of a login request when the login password matches the access password, the first count is less than the selected limit, and the second count has reached the selected first threshold only if the second count is less than a selected second threshold.

4. The method of claim 3, where the selected first and second thresholds are the same.

5. The method of claim 3, where the selected first threshold is less than the selected second threshold.

6. The method of claim 1, where the access password is stored in the clear by the application, and the login password is matched against the access password by checking if they are equal.

7. The method of claim 1, where the application stores a salt and a cryptographic hash of the salt and the access password, and the login password is matched against the access password by computing a cryptographic hash of the stored salt and the login password and checking if the computed hash is equal to the stored hash.

8. The method of claim 1, wherein the access account is a user account and the access password is a user password.

9. The method of claim 8, wherein the application is a multi-user application having a plurality of user accounts each having an associated user ID and an associated user password, wherein each login request includes a login ID in addition to the login password, and wherein a login request pertains to a user account when the login ID matches the user ID associated with the user account.

10. The method of claim 8, wherein the application is a multi-instance application having a plurality of virtual application instances, each virtual application instance having an instance name and a plurality of user accounts, each user account having a user ID and a user password, wherein each login request includes a login name and a login ID in addition to the login password, wherein a login request pertains to a user account of a virtual application instance when the login name matches the instance name and the login ID matches the user ID associated with the user account.

11. The method of claim 1, wherein the application is a Web application running on one server computer or a distributed Web application running on multiple server computers, wherein a login request is an HTTP request and the application is further accessed after login through further HTTP requests, each HTTP request being sent by a Web browser to at least one server computer over a network connection.

12. The method of claim 11, wherein the network connection is encrypted and the at least one server computer is authenticated by a public-key/private-key pair and a digital certificate.

13. The method of claim 11, wherein access to the application is granted by an HTTP cookie set in the Web browser, the value of the cookie being a session ID of a login session.

14. The method of claim 11, wherein limited access to the application is granted by an HTTP cookie set in the Web browser, the value of the cookie being a session ID of a temporary session.

15. A computer readable storage medium storing computer-executable instructions for controlling at least one computer system to perform a method of controlling access to an interaction context of a multi-user application, the method comprising:
receiving and tracking over time login requests pertaining to one of a plurality of user accounts of a virtual application instance of the multi-user application, including a login request, each login request including a login password and each user account including a user password;
rejecting the login request for the user account when the login password fails to match the user password of the user account;
denying access to the user account when a first count reaches a selected limit, the first count counting a consecutive number of times login requests for the user account are rejected;
prompting the user to change the user password of the user account and granting limited access to the user account to do so when the login password matches the user password, the user password is a permanent password, and a second count reaches a first selected threshold, the second count counting a cumulative number of rejected login requests for the user account;
granting access to the user account when the login password matches the user password, the first count is less than the selected limit, the user password is a permanent password, and the second count is less than the selected threshold; and
incrementing the first and second counts, at least until the first count has reached the selected limit, when the login password of the login request fails to match the user password; and
resetting the first and second counts when the user password is changed.

16. The computer readable storage medium of claim 15, the method comprising
prompting the user to change the user password and granting partial access to the user account to do so when the user password of the user account is a temporary password.

17. The computer readable storage medium of claim 15, wherein a successful login request is not deemed to interrupt a sequence of consecutive rejected login requests if the cumulative number of rejected login rejects has reached a second threshold.

18. The computer readable storage medium of claim 15, wherein each user record includes a User ID, and wherein the login request includes a login ID, the method comprising:
denying the login request when login ID fails to match the User ID.

19. The computer readable storage medium of claim 15, wherein the multi-user application includes a plurality of virtual application instances, each virtual application instance having an instance name and having an associated plurality of user accounts, and wherein the login request includes a login name, the method comprising:
denying the login request when the login name fails to match an instance name of any of the plurality of instance names.

20. The computer readable storage medium of claim 15, wherein each user account includes a salt value and the user password comprises a hash of the user password and the salt value and wherein rejecting the login request includes:
computing a hash of the login password and the salt value; and
comparing the hash of the login password and the salt value and the hash of the user password and the salt value.

21. A server computer comprising:
at least one virtual application instance;
an instance database for each virtual application instance including one or more user records, each user record containing login data for accessing an associated user account of the virtual application instance and including a user ID, a short counter value, a long counter value, and a user password; and
a login module configured to receive a login request for a virtual application instance from a user including a login ID and a login password, and if the login ID matches a user ID of a user record of the corresponding instance database, configured to:
reject the login request and deny access to the user account if the short counter value has reached a short counter limit; and
prompt the user to change the user password and grant the user partial access to the user account that allows the user to change the password if the login password matches the user password of the user record and if the long counter value has reached a first long counter threshold;
wherein the short counter value of a user record represents a consecutive number of login requests having a login user ID matching the user ID of the user record but having a login password that fails to match the user password of the user record as long as the long counter has not reached a second long counter threshold; and
wherein the long counter value of a user record represents a cumulative number of login requests having a login user ID matching the user ID of the user record but having a login password that fails to match the user password of the user record.

22. The server computer of claim 21, wherein the login module, if the login ID matches the user ID of a user record but the login password fails to match the user password of the user record, is configured to:
reject the login request;
increment the short counter; and
increment the long counter if the user password is permanent.

23. The server computer of claim 21, wherein the login module, if the login ID matches the user ID of a user record and the login password matches the user password of the user record, is configured to:
accept the login request and grant the user at least partial access to the user account; and
set the short counter number to zero if the password is a permanent password, but only if the long counter value is less than the second long counter threshold.

24. The server computer of claim 21, wherein each virtual application instance has an instance name, wherein the login request further includes a login instance name, and wherein the login module is configured to reject the login request if the login instance name does not match an instance name of any of the virtual application instances.

25. The server computer of claim 21, comprising:
a central database including an instance record for each of the virtual application instances, each instance record including at least the instance name of the corresponding virtual application instance.

26. The server computer of claim 21, wherein each user record includes a salt value, and wherein the user password comprises a hash of the concatenation of the user password and the salt value.

27. The server computer of claim 21, wherein each instance database includes a password table containing any user passwords used for each user account, wherein the login module is configured to reference the password table to prevent a user from reusing a previously used password when the user is forced to change the user password.

* * * * *